United States Patent [19]

Knöfel et al.

[11] 4,093,658

[45] June 6, 1978

[54] PROCESS FOR THE PREPARATION OF AROMATIC POLYAMINES

[75] Inventors: Hartmut Knöfel, Leverkusen; Günther Ellendt, Krefeld, both of Germany

[73] Assignee: Bayer Aktiengesellschaft, Leverkusen, Germany

[21] Appl. No.: 645,041

[22] Filed: Dec. 29, 1975

[30] Foreign Application Priority Data

Jan. 9, 1975 Germany .............................. 2500574

[51] Int. Cl.$^2$ ............................................ C07C 85/24
[52] U.S. Cl. ........................ 260/570 D; 260/570.5 P; 260/570.9; 560/19; 560/20
[58] Field of Search ............................ 260/570 D, 471

[56] References Cited

U.S. PATENT DOCUMENTS

| | | | |
|---|---|---|---|
| 3,297,759 | 1/1967 | Curtiss et al. | 260/570 |
| 3,476,806 | 11/1969 | Wolf | 260/570 |
| 3,478,099 | 11/1969 | Ross et al. | 260/570 |
| 3,576,875 | 4/1971 | Robe | 260/570 |
| 3,676,497 | 7/1972 | Recchia et al. | 260/570 |
| 3,996,283 | 12/1976 | Knofel | 260/570 |

*Primary Examiner*—Robert V. Hines
*Attorney, Agent, or Firm*—Gene Harsh; Joseph C. Gil

[57] ABSTRACT

The instant invention is directed to a novel process for the production of aromatic polyamines. In one embodiment, the process comprises (A) condensing an aromatic amine with formaldehyde in the presence of a hydrophobic solvent and in the absence of an acid catalyst to produce a precondensate mixture containing the corresponding N,N'-disubstituted aminals, (B) removing substantially all the water from said precondensate mixture to produce a first organic phase, (C) mixing said first organic phase with an aqueous solution containing an acid catalyst thereby producing a first two-phase mixture, (D) subjecting said first two-phase mixture to a first rearrangement reaction wherein a mono-N-substituted aminal is formed and wherein a second two-phase mixture is produced, (E) separating said second two-phase mixture into a second organic phase and a first aqueous phase, (F) subjecting said first aqueous phase to at least one more rearrangement reaction thereby producing an aqueous condensation mixture containing said aromatic polyamines, (G) extracting said aqueous condensation mixture with a hydrophobic solvent to provide a solvent phase and a second aqueous phase comprising an aqueous solution containing the acid catalyst as an amine salt of said aromatic amine, and of said aromatic polyamines, (H) recovering aromatic polyamines from said solvent phase, and (I) returning said second aqueous phase to step (C).

10 Claims, 2 Drawing Figures

4,093,658

PROCESS FOR THE PREPARATION OF AROMATIC POLYAMINES

BACKGROUND OF THE INVENTION

A process for the preparation of multi-nuclear aromatic polyamines by the condensation of aromatic amines with formaldehyde in the presence of water and acid catalysts is described in U.S. application Ser. No. 383,921, filed July 30, 1973 and now U.S. Pat. No. 3,996,283. In that process, the aqueous condensation mixture obtained after the reaction has been completed is extracted with a hydrophobic solvent without neutralization of the catalyst. The desired polyamine is then isolated from the solvent phase while the aqueous phase, which contains the acid catalyst in the form of amine salts, is returned to the beginning of the process with the addition of fresh amine.

The above mentioned process marked a major improvement compared with the previously known processes for aniline/formaldehyde condensation using acid catalysts, particularly since it obviated the need for neutralization of the acid catalyst. As a result, the effluent water from the process is substantially salt-free. Additionally, there is practically no consumption of acid catalyst or of alkalizing agent.

DESCRIPTION OF THE INVENTION

Figure 1:
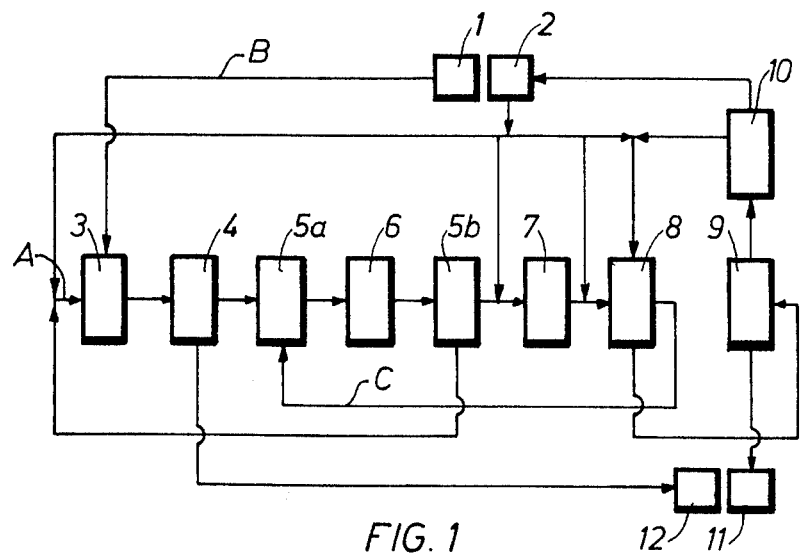
FIG. 1 represents a flow diagram illustrating one embodiment of the present invention.

The present invention relates to a further improvement of the prior process which enables polyamines having an exceptionally low ortho-isomer content in the dinuclear fraction of the product to be obtained. In particular, the process according to the present invention enables aniline/formaldehyde condensates having a greatly reduced 2,2'-diaminodiphenylmethane content to be prepared.

The present invention therefore relates to a process for the preparation of multi-nuclear aromatic polyamines by the condensation of aromatic amines with formaldehyde to form the corresponding N,N'-disubstituted aminals in the absence of acid catalysts, followed by rearrangement of these aminals to form multinuclear aromatic polyamines in the presence of water and acid catalysts in a rearrangement reaction carried out in at least two stages, followed by extracton of the resulting aqueous reaction mixture with a hydrophobic solvent, optionally with the addition of the same aromatic amine as that used for condensation, working up of the resulting solvent phase in known manner to isolate the multinuclear aromatic polyamine and return of the aqueous phase which contains the acid catalyst. The process is characterized in that (a) condensation of the aromatic amine with formaldehyde is carried out in the presence of a hydrophobic solvent, (b) the water of condensation and any wayer introduced with formaldehyde is removed from the system by means of a water separator, (c) the organic phase leaving the water separator, which contains the aminal, is mixed with the returned aqueous phase which contains the acid catalyst, (d) the two phase mixture obtained according to (c) is transferred to the rearrangement reaction stage in which (e) the two phase mixture is separated into its phases in a phase separator after the first rearrangement stage and before the extraction stage and, in the most preferably embodiment, (f) the solvent phase obtained according to (e) is returned to the beginning of the process.

More particularly, the instant invention is directed to a process for the preparation of a multi-nuclear aromatic polyamine comprising:

(A) condensing an aromatic amine with formaldehyde in the presence of a hydrophobic solvent and in the absence of an acid catalyst to produce a precondensate mixture containing the corresponding N,N'-disubstituted aminals, (B) removing substantially all the water from said precondensate mixture to produce a first organic phase, (C) mixing said first organic phase with an aqueous solution containing an acid catalyst thereby producing a first two-phase mixture, (D) subjecting said first two-phase mixture to a first rearrangement reaction wherein a mono-N-substituted aminal is formed and wherein a second two-phase mixture is produced, (E) separating said second two-phase mixture into a second organic phase and a first aqueous phase, (F) subjecting said first aqueous phase to at least one more rearrangement reaction thereby producing an aqueous condensation mixture containing said aromatic polyamines, (G) extracting said aqueous condensation mixture with a hydrophobic solvent to provide a solvent phase and a second aqueous phase comprising an aqueous solution containing the acid catalyst as an amine salt of said aromatic amine, and of said aromatic polyamines, (H) recovering aromatic polyamines from said solvent phase, and (I) returning said second aqueous phase to step (C).

In a second embodiment, the process comprises (A) condensing an aromatic amine with formaldehyde in the presence of a hydrophobic solvent and in the absence of an acid catalyst to produce a precondensate mixture, (B) removing substantially all the water from said precondensate mixture to produce a first organic phase, (C) mixing said first organic phase with an aqueous solution containing an acid catalyst thereby producing a two-phase mixture, (D) subjecting said two-phase mixture to a rearrangement reaction thereby producing a second organic phase and an aqueous condensation mixture phase containing said aromatic polyamines, (E) separating said second organic phase and said aqueous condensation mixture phase, (F) extracting said aqueous condensation mixture phase with a hydrophobic solvent to provide a solvent phase and an aqueous phase comprising an aqueous solution containing the acid catalyst as an amine salt of said aromatic amine, and of said aromatic polyamines, (G) recovering aromatic polyamines from said solvent phase, and (H) returning said aqueous phase to step (C).

In both embodiments, the second organic phase is preferably returned to the beginning of the process.

Figure 2:
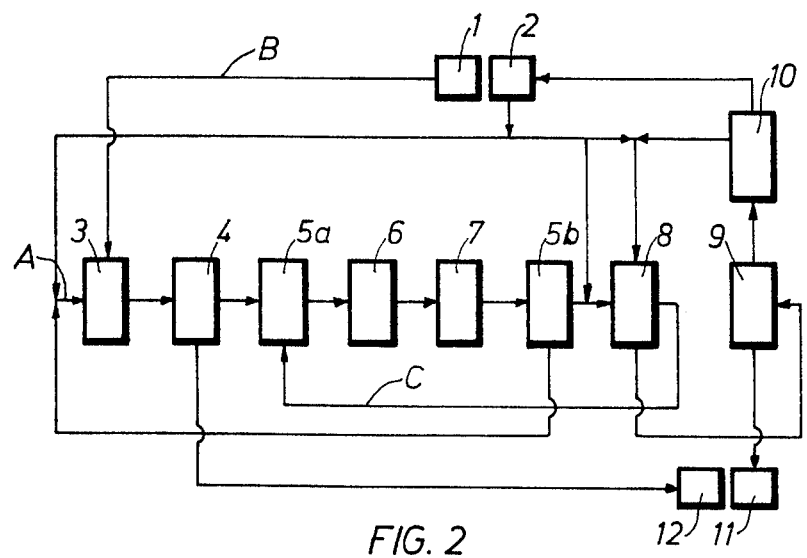
FIG. 2 represents a second embodiment of the present invention.

The principle of the processes according to the invention will now be described in more detail with reference to FIGS. 1 and 2.

The reference numerals in these Figures represent the following parts:

(1) a tank for an aqueous formaldehyde solution
(2) a tank for aniline
(3) a condensation reactor
(4) a water separator
(5a) a mixer
(5b) a separator
(6) a first molecular rearrangement reactor
(7) a second rearrangement reactor
(8) an extractor
(9) a distillation column
(10) a second distillation column
(11) a tank for the product of the process
(12) a tank for effluent water.

The catalyst-free reaction of aniline with formaldehyde to form the corresponding N,N'-diphenyl aminal takes place in 3. This reaction is carried out in the presence of hydrophobic solvent which is circulated through 3, 4 and 5b. In the water separator 4, water introduced with the formaldehyde or formed by the condensation reaction is removed from the two phase system by simple phase separation based on the density difference between the phases. It may be advisable to return part of the aqueous phase to improve the efficiency of this water separator. The solvent phase leaving the water separator enters the mixer 5a in which the solvent phase is mixed with the aqueous phase from extractor 8. The two phase system leaving the mixer 5a enters the first rearrangement stage 6 in which mainly the first rearrangement to the mono-N-substituted intermediate product takes place.

In a first embodiment of the process according to the invention (see FIG. 1), the mixture leaving the first rearrangement stage 6 enters a phase separator 5b in which the two phases are separated on the basis of their differing densities. The solvent phase leaving the phase separator 5b is preferably returned to the beginning of the process. The aqueous phase leaving the separator 5b then enters a second rearrangement reactor 7 in which final rearrangement to the product of the process takes place, if necessary after further addition of aniline. The aqueous phase containing the product of the process is transferred from 7 to the extractor 8, if necessary after further addition of aniline, where the product of the process is removed by extraction with a hydrophobic solvent from the aqueous phase. The solvent phase discharged from the extractor 8 is worked up by distillation in distillation columns 9 and 10. The solvent leaving the distillation column 10 is returned to the extractor 8, if necessary after the addition of aniline. The final product is obtained as the sump product of column 9. The aqueous phase containing the catalyst is returned from the extractor 8 to the mixer 5a.

In a second embodiment of the process according to the invention (see FIG. 2), the two phase mixture leaving the first rearrangement reactor is directly transferred to the second rearrangement reactor 7 in which rearrangement to the final product takes place. According to this second embodiment of the invention, the completely reacted mixture leaving the reactor 7 enters the phase separator 5b and from there, the organic phase is preferably returned to the beginning of the process as in the first embodiment, while the aqueous phase is transferred to the extractor 8, if necessary after further addition of aniline. All further steps of the process in this second embodiment are similar to those in the first embodiment.

In the first embodiment of the process according to the invention, essentially all of the N-(2-aminobenzyl)-aniline in the mixture leaving the reactor 6 remains in the organic phase leaving the separator 5b, and is thus returned to the beginning of the process. N-(2-aminobenzyl)-aniline is an intermediate product leading to the unwanted compound 2,2'-diaminodiphenylmethane. By removing this intermediate product, the possibility of formation of the unwanted isomer in the second rearrangement reactor is avoided. Since, however, N-(2-aminobenzyl-aniline reacts more rapidly with additional formaldehyde than aniline, the return of this intermediate product and its preferential further reaction with formaldehyde finally leads to the formation of trinuclear and higher nuclear polyamines of the diphenylmethane series. The advantage of the first embodiment of the process according to the invention can therefore be seen in the possibility which it provides of producing polyamines of the diphenylmethane series having an exceptionally low 2,2'-diaminodiphenylmethane content.

In the second embodiment of the process according to the invention, the solvent phase leaving the phase separator 5b contains substantial proportions of the 2,2'- and 2,4'-isomers which are present in the mixture leaving the reactor 7. The return of these isomers to the beginning of the process in accordance with the second embodiment of the invention results in their preferential further reaction to trinuclear or higher nuclear polyamines of the diphenylmethane series. This is due to the fact that the o-isomers react much more rapidly with additional formaldehyde than does aniline but react slower than the corresponding p-isomers, such as 4,4'-diaminodiphenylmethane. Although separation of isomers takes place in the phase separator 5b so that the aqueous phase contains mainly p-isomers and the solvent phase mainly the aforesaid o-isomers, this separation of isomers is not, of course, quantitative. Since, however, as mentioned above, the p-isomers present in the solvent phase react more slowly than the o-isomers, (a) the concentration of isomers in the phase separator 5b and (b) the preferential subsequent reaction of the o-isomers, ensure that this second embodiment of the process according to the invention also results in polyamines of the diphenylmethane series having a greatly reduced o-isomer content.

Another advantage of the second embodiment of the process according to the invention is to be seen in the fact that any incompletely reacted intermediate products still present in the mixture leaving the reactor 7 also preferentially remain in the solvent phase so that after their return to the beginning of the process, they subsequently continue to react to form the desired end product by passing through the whole reaction path again.

Another advantage common to both embodiments of the process is that the water introduced into the system, for example, with an aqueous formalin solution, and the water formed in the condensation reaction can be removed in a simple water separator without any need for distillation.

The embodiments described above serve to explain the principle of the invention. Thus, for example, instead of using aniline, the process according to the invention could, of course, be carried out with other aromatic amines, examples of which are given below. Furthermore, the rearrangement reaction could, of course, be carried out in more than two reactors. A larger number of extraction stages than indicated could be used for extracting the product of the process. Distillation of the organic phase could also in principle be carried out in one distillation column or in more than two. The only essential features of the invention are the measures indicated above as characterizing the process according to the invention. In the multi-stage rearrangement reaction, the only essential criteria are that, according to the first embodiment, phase separation should take place after the first rearrangement stage and according to the second embodiment, it should take place after the last rearrangement stage.

Any aromatic amines may be used in the process according to the invention including aniline, o-toluidine, m-toluidine, N-methyl aniline, N-ethyl aniline, 2,6-dimethyl aniline, 2,6-diethyl aniline, 2,6-diisopropyl aniline, 2,4-diamino-toluene, anthranilic acid alkyl esters containing 1 to 4 carbon atoms in the alkyl group and mixtures of such amines. The preferred aromatic amine for the process according to the invention is aniline.

The acids used in the process according to the invention are preferably water-soluble acids having a pKA-value below 2.5 and preferably below 1.5. Examples include hydrochloric acid, hydrobromic acid, sulphuruc acid, methane sulphonic acid/trifluoroacetic acid or phosphoric acid. The presently preferred catalyst is hydrochloric acid. The above mentioned acids may also be mixed with acid or neutral salts of such acids, for example, the corresponding ammonium salts or the corresponding alkali metal salts. In the process according to the invention, these acids are present in the aqueous system in the form of the corresponding amine salts of the aromatic amines which are in the aqueous cycle.

Hydrophobic solvents used for the process according to the invention include essentially any water immiscible solvents having boiling points within a range of approximately 30° – 250° C, preferably 80° – 200° C, which are inert with the reactants. Particularly suitable solvents include chlorobenzene, dichlorobenzene, benzene, toluene, xylenes, dichloroethane, chloroform, carbon tetrachloride and the like. The aromatic amine used as reactant or some other arylamine may also serve as the hydrophobic solvent in which case it would be added to process where necessary. The preferred solvent is o-xylene. The solvents are generally used for the extraction in quantities corresponding to a volumetric ratio of acid condensation mixture to solvent phase of between 5:1 and 1:10 and preferably between 2:1 and 1:5.

In addition to the aromatic amine, the other starting material for the process according to the invention is formaldehyde preferably used in the form of an aqueous formalin solution.

The molar ratio of aniline to formaldehyde at the beginning of the condensation reaction (reactor 3) is generally between 1:1 and 10:1 and preferably between 2:1 and 5:1.

The volumetric ratio of (aniline + formaldehyde) to (water) at the beginning of the condensation reaction is generally between 1:1 and 12:1 but this ratio is not critical for the process according to the invention.

The volumetric ratio of (aqueous amine salt solution) to (solvent phase) in the mixer 5a is generally between 5:1 and 1:10, preferably between 5:1 and 1:5 and most preferably between 3:1 and 1:3. In order to start the process the acid which is used as catalyst is added preferably as aniline salt solution in water into mixer 5a and remains in the cyclic system as said aqueous amine salt solution.

Apart from the aforesaid intermediate products which are to be returned to the beginning of the process or the unwanted end products, the solvent phase leaving the separator 5b contains up to 60% by weight of the free aromatic amine used as starting material and, particularly in the first embodiment, it may also contain varying proportions of precondensates. These proportions become practically constant once equilibrium has become established in the continuously operating system. In the second embodiment, it may also contain final products of the process. However, these substances do not interfere with the process according to the invention since the unwanted intermediate products (N-(2-aminobenzyl)-aniline) and the unwanted products of the process (2,4'-and especially 2,2'-diaminodiphenylmethane) are more reactive with additional formaldehyde than the corresonding p-substituted intermediate products or end products (N-(4-aminobenzyl)-aniline and 4,4'-diaminodiphenylmethane). Apart from the aminal formed from the starting aromatic amine and formaldehyde and the first secondary products produced from the returned intermediate products and end products, the phase mixture introduce into the reactor 6 contains the major proportion of the product of the process and free aniline which was already present in the aqueous phase leaving the extractor 8. Since extraction of the end product is not achieved quantitatively in the main extractor 8 (both phases leaving the extractor 8 invariably containing an equilibrium mixture of starting amine and end product), some end product is also returned to mixer 5a without, however, interfering with the progress of the process. The amines mentioned above are partly protonized by the acid catalyst. The degree of protonation (percentage of total quantity of nitrogen atoms present as amine salt groups) is always below 100% at the inlet to the reactor 6 even if the degree of protonation is 100% in the aqueous phase returned from the extractor 8. It is one of the further advantages of the process according to the invention that for a given constant circulation of aqueous catalyst, the degree of protonation can be varied within wide limits before entry into the first rearrangement stage 6. The degree of protonation at the entry into the first rearrangement stage is generally between 10 and 95% and preferably between 30 and 90%. It can be varied (a) by the extraction conditions in 8, since with decreasing efficiency of the extractors increasing quantities of free amine remain in the aqueous phases and (b) by variation of the rates of flow of substances in the mixer 5a and the extractor 8, and in particular the amine content of the solvents flowing through the mixer and the extractor.

The process according to the invention is preferably carried out with a two-stage rearrangement reaction (reactors 6 and 7). Rearrangement of the original precondensates of the N,N'-disubstituted aminal series to mono-N-substituted intermediate products generally takes place in reactor 6 and rearrangement of the said intermediate product to the desired end product takes place in reactor 7. In the first embodiment of the invention, it may be advisable to bring about a further reduction in the degree of protonation of the aqueous reaction mixture leaving the reactor 6 by adding a further quantity of aniline.

The aqueous reaction mixture is then transferred from the last rearrangement stage 7 to the extractor 8 for extraction. The hydrophobic solvent used in this extractor preferably has a free aniline content of 10 to 80% by weight and more preferably 20 to 60% by weight. The aqueous phase entering the extractor 8 generally contains 10 to 60% and preferably 12 to 30% by weight of free amine, i.e. amine which is not protonated. This free amine content may be adjusted by the addition of aniline after the last rearrangement stage 7 if sufficient aniline has not already been added to the aqueous phase before its entry into the last rearrangement stage 7.

The concentration of free amines in the aqueous phase and in the organic phase is preferably adjusted so that the solution pressure of free arylamine in the aqueous phase at the inlet to the extractor 8 is equal to the solution pressure of aromatic amine in the organic phase at the same point of the extraction stage.

The organic phase leaving the extractor 8 is separated into the desired aniline/formaldehyde condensate and solvent and aniline by distillation in known manner. Separation of the solvent and aniline may be omitted if aniline-containing solvents can be used in extractor 8 (in all stages in the case of multi-stage extraction).

The aqueous solution leaving the extraction stage is transferred to the mixer 5a. The degree of protonation of the aqueous solution leaving the extractor 8 is generally between 30 and 70%. If desired, free amine may be removed from the aqueous solution before its return to the mixer 5a by an additional extraction (not shown in the drawings and not essential to the invention), preferably carried out with amine-free solvent, so that an aqueous phase having a degree of protonation of close on 100% is returned to the mixer 5a.

The following temperatures are preferably employed in the process according to the invention:

Case 1 (see FIG. 1):
Precondensation (reactor 3) at 0° – 60° C, in particular 20° – 40° C.
Water separation in separator 4 at 5° – 60° C, in particular 20° –40° C.
Mixing in mixer 5a at 5° – 60° C, in particular 20° – 40° C. Rearrangement reaction in first rearrangement reactor 6 at 5° – 40° C and in last rearrangement reactor 7 at 60° – 110° C.
Main extraction 8 generally at 70° – 110° C, preferably at 80° – 100° C.

Case 2 (see FIG. 2):
Precondensation (reactor 3) at 0° – 80° C, in particular 20° – 40° C.
Water separation in separator 4 at 5° – 80° C, in particular 20° – 60° C.

Mixing in mixer 5a at b 5° – 80° C, in particular at 20° – 60° C. If rearrangement is carried out in two stages, the rearrangement reaction in the first reactor 6 is carried out at 5° – 40° C and in the last reactor 7 at 60° – 110° C; the main extraction (8) is generally carried out 70° – 110° C and preferably at 80° – 100° C.

The nature of the extraction apparatus used is not material to the process of the invention, and thus, the known tube reactors or known liquid-liquid extractors, mixers or phase-separators conventionally used in chemical processes are suitable.

The process according to the invention may, of course, be carried out quite independently of the apparatus which have been illustrated merely by way of example in the drawings. In particular, all the stages of the process (precondensation, water separation, mixing, phase-separation and extraction) may be carried out in one-stage or several stages. Only in the first embodiment of the process according to the invention, of course, must the rearrangement reaction be carried out in at least two stages. In the second embodiment of the process, a single-stage rearrangement reaction could, in theory, be carried out. The aromatic amine used as starting material can be fed into the system at any point, as already indicated (inlet to precondensation and/or inlet to last rearrangement stage and/or inlet to extraction stage 8. In the extreme case, one could even add the total quantity of starting aromatic amine to the solvent used for extraction in the extraction stage 8. In that case, free starting amine would enter the aqueous phase since the amine salts dissolved therein act as solubilizing agents for free amine in water, and the free amine would finally enter the first reactor 3 by way of the mixer 5a and separator 5b.

EXAMPLE 1 (FIG. 2)

A 20% solution of an aromatic amine mixture in o-oxylene (A) and a 30% aqueous formaldehyde solution (B) from container 1 are continuously introduced into a reactor 3 comprising two stirrer equipped vessels connected in series in a continuously operating experimental laboratory installation. The two streams have the following composition indicated in grams per hour:

| Stream (A) | 5365 o-xylene, |
| | 1350 aniline and |
| | polyarylamine |
| Stream (B) | 108 formaldehyde |
| | 252 water |

The temperature of the reaction mixture in both vessels in kept at 35° C by means of vigorous stirring and cooling. The reaction is then transferred to the separator 4 which is also maintained at 35° C, where water is removed at the rate of about 317 g per hour from the aqueous phase of the two phase system, which aqueous phase is kept at a constant level.

The organic phase from separator 4 is continuously mixed at 35° C with an aqueous stream (C) of the following composition (g/h) in the mixer 5a which constitutes the first vessel of a cascade of six stirrer equipped vessels:

| Stream (C) | 1340 aniline |
| | 123 polyarylamine |
| | 547 hydrogen chloride |
| | 2460 water. |

The temperature of the reaction mixture flowing through the cascade of vessels (reactors 6 and 7) rises from 35° C to 95° C.

The organic phase is separated at 90° to 95° C in a separator 5b following the reactor 7, and after the addition of aniline, it is adjusted to its original aromatic amine content and again reacted as stream (A) with formaldehyde. Before the addition of aniline, it is advantageous to extract the water from the separator 4 with the xylene phase separated in 5b.

The aqueous phase leaving the separator 5b is adjusted to an amine content of about 50% by weight by the addition of aniline and then enters the extraction system 8 consisting of a first and second extraction column arranged one behind the other. In the first extraction column the aqueous phase is extracted with a mixture of aniline and xylene (weight ratio = 1,1:1) which corresponds to the organic phase leaving the second extraction column plus additional aniline to adjust the aniline content to above ratio. The first extraction column runs at a temperature of 90° - 95° C. The extractant used in the second extraction column is 5830 gram per hour of o-xylene.

The organic phase leaving the extraction system 8 is separated into aniline, xylene and polyarylamine (approximately 700 gram per hour) in the distillation apparatus 9 and 10. The recovered aniline together with fresh aniline added to the system is distributed to the various feed points of the reaction cycle from the container 2.

The product obtained from the particular embodiment of the process described by way of example has the average composition (I) in the dinuclear portion.

The polyarylamine removed together with xylene and aniline at 5b has the equilibrium composition (II).

An experiment carried out by a process which did not have the features according to the invention but was otherwise completely analogous yielded a product which had the average composition (III) in the dinuclear portion:

| Composition of dinuclear portions (% by weight) | I | II | III |
| --- | --- | --- | --- |
| 2,2'-diaminodiphenylmethane | 0.1 | 7.3 | 0.5 |
| 2,4'-diaminodiphenylmethane | 4.6 | 31.6 | 7.4 |
| 4,4'-diaminodiphenylmethane | 95.2 | 61.1 | 92.0 |

EXAMPLE 2 (FIG. 1)

In a continuously operating experimental laboratory installation, a 15% solution of an arylamine mixture in o-xylene (A) and a 30% aqueous formaldehyde solution (B) from container 1 are continuously fed into the reactor 3 which consists of two stirrer equipped vessels connected in series. The two streams have the following compositions in gram per hour:

| Stream (A) | 7590 o-xylene |
| --- | --- |
| | 1360 aniline and aniline-formaldehyde condensates |
| Stream (B) | 108 formaldehyde |
| | 252 water. |

The temperature of the reaction mixture in both vessels is kept at 35° C by means of vigorous stirring and cooling. The reaction mixture is then transferred to separator 4 which is also maintained at 35° C and where water at the rate of about 317 g per hour is removed from the aqueous phase of the two phase systems, which aqueous phase is kept at a constant level.

The organic phase from separator 4 is continuously mixed at 35° C with the aqueous stream (C) which has the following composition (gram per hour) in the mixer 5a which constitutes the first vessel of the reactor 6 which consists of three stirrer equipped vessels:

| Stream (C) | 1340 aniline |
| --- | --- |
| | 123 polyarylamine |
| | 547 hydrogen chloride |
| | 2460 water. |

The temperature of the reaction mixture does not rise above 40° C in its passage through the cascade of vessels (reactor 6).

The organic phase is separated at 35° - 40° C in a separator 5b following the reactor 6, and by addition of the appropriate quantity of aniline it is adjusted to its original arylamine content and again reacted with formaldehyde as the steam (A). Before the addition of aniline, it is advantageous to extract the water removed from separator 4 by means of the xylene phase separated in 5b.

The aqueous phase from separator 5b enters the reactor 7 which consists of three stirrer vessels connected in series. Transposition to the end products takes place in these vessels at temperature ranging from 80° C in the first vessel to 95° C in the third vessel.

The aqueous phase leaving the reactor 7 is adjusted to an amine content of about 50% by weight by the addition of aniline and then enters the extraction system 8 consisting of a first extraction column followed by a second extraction column. In the first extraction column the aqueous phase is extracted with a mixture of aniline and xylene (weight ratio = 1,1:1) which corresponds to the organic phase leaving the second extraction column plus additional aniline to adjust the aniline content to above ratio. The first extraction column runs at a temperature of 90° - 95° C. 5830 gram per hour of o-xylene are used as extractant for the second extraction column.

The organic phase leaving the extraction system 8 is separated into aniline, o-xylene and polyarylamine (approx. 700 g per hour) in the distillation apparatus 9 and 10. The recovered aniline together with fresh aniline added to the system is distributed to the various feed points of the reaction cycle from the container 2.

The product obtained in the embodiment of the process described as an example of the invention has the following average composition in the dinuclear portion:
2,2'-diaminodiphenylmethane: (11) 0.1% by weight
2,4'-diaminodiphenylmethane: (11) 3.8% by weight
4,4'-diaminodiphenylmethane: 96.1% by weight

What is claimed is:

1. A process for the preparation of multinuclear aromatic polyamines comprising:
   (A) condensing an aromatic amine with formaldehyde in the presence of a hydrophobic solvent and in the absence of an acid catalyst to produce a precondensate mixture containing the corresponding N,N'-disubstituted aminals,
   (B) removing substantially all the water from said precondensate mixture to produce a first organic phase,
   (C) mixing said first organic phase with an aqueous solution containing an acid catalyst thereby producing a first two-phase mixture,
   (D) subjecting said first two-phase mixture to a first rearrangement reaction wherein a mono-N-substituted aminal is formed and wherein a second two-phase mixture is produced,
   (E) separating said second two-phase mixture into a second organic phase and a first aqueous phase, (F) subjecting said first aqueous phase to at least one more rearrangement reaction thereby producing an aqueous condensation mixture containing said aromatic polyamines, (G) extracting said aqueous condensation mixture with a hydrophobic solvent to provide a solvent phase and a second aqueous phase comprising an aqueous solution containing the acid catalyst as an amine salt of said aromatic amine, and of said aromatic polyamines, (H) recovering aromatic polyamines from said solvent phase, and (I) returning said second aqueous phase to step (C).

2. The process of claim 1, further comprising (K) returning said second organic phase to step (A).

3. The process of claim 2, wherein said aromatic amine is aniline.

4. The process of claim 3, wherein said acid catalyst is hydrochloric acid in the form of hydrochlorides of aniline and aniline/formaldehyde condensates.

5. The process of claim 1, wherein a mixture of hydrophobic solvent and said aromatic amine is used in step (G).

6. A process for the preparation of multi-nuclear aromatic polyamines comprising:

(A) condensing an aromatic amine with formaldehyde in the presence of a hydrophobic solvent and in the absence of an acid catalyst to produce a precondensate mixture, (B) removing substantially all the water from said precondensate mixture to produce a first organic phase, (C) mixing said first organic phase with an aqueous solution containing an acid catalyst thereby producing a two-phase mixture, (D) subjecting said two phase mixture to a rearrangement reaction thereby producing a second organic phase and an aqueous condensation mixture phase containing said aromatic polyamines, (E) separating said second organic phase and said aqueous condensation mixture phase, (F) extracting said aqueous condensation mixture phase with a hydrophobic solvent to provide a solvent phase and an aqueous phase comprising an aqueous solution containing the acid catalyst as an amine salt of said aromatic amine, and of said aromatic polyamines, (G) recovering aromatic polyamines from said solvent phase, and (H) returning said aqueous phase to step (C).

7. The process of claim 6, further comprising (I) returning said second organic phase to step (A).

8. The process of claim 7, wherein said aromatic amine is aniline.

9. The process of claim 8, wherein said acid catalyst is hydrochloric acid in the form of hydrochlorides of aniline and aniline/formaldehyde condensates.

10. The process of claim 6 wherein a mixture of hydrophobic solvent and said aromatic amine is used in step (F).

* * * * *